United States Patent [19]

Brown

[11] Patent Number: 4,464,141

[45] Date of Patent: Aug. 7, 1984

[54] SHAFT COUPLING

[75] Inventor: Harry W. Brown, Annapolis, Md.

[73] Assignee: Arinc Research Corporation, Annapolis, Md.

[21] Appl. No.: 373,639

[22] Filed: Apr. 30, 1982

[51] Int. Cl.³ ............................................... F16D 3/52
[52] U.S. Cl. .................................... 464/75; 464/89; 464/150; 464/159
[58] Field of Search ............... 74/462; 464/74, 75, 464/89, 150, 158, 159, 903, 154, 156

[56] References Cited

U.S. PATENT DOCUMENTS

| | | | |
|---|---|---|---|
| 1,188,854 | 6/1916 | Spacie | 464/159 X |
| 1,841,418 | 1/1932 | Scott | 464/150 |
| 2,235,605 | 3/1941 | Bugatti | 464/89 X |
| 2,682,760 | 7/1954 | Shenk | 74/462 X |
| 2,769,323 | 11/1956 | O'Malley | 464/156 |
| 2,841,966 | 7/1958 | Belden et al. | 464/154 |
| 3,232,075 | 2/1966 | Wildhaber | 464/158 |
| 3,257,860 | 6/1966 | Runde et al. | 464/75 X |
| 3,321,935 | 5/1967 | Wildhaber | 464/75 |
| 3,620,043 | 11/1971 | Gantschnigg | 464/156 X |
| 4,098,096 | 7/1978 | Chard et al. | 464/89 |
| 4,357,137 | 11/1982 | Brown | 464/75 |

FOREIGN PATENT DOCUMENTS

| | | |
|---|---|---|
| 1314856 | 12/1962 | France . |
| 1589766 | 5/1970 | France . |
| 237149 | 7/1925 | United Kingdom . |
| 1034305 | 6/1966 | United Kingdom . |

Primary Examiner—Stuart S. Levy
Assistant Examiner—Daniel P. Stodola
Attorney, Agent, or Firm—Parkhurst & Oliff

[57] ABSTRACT

A shaft coupling system for accommodating axial displacement and angular misalignment between two shafts. A hollow bushing is force fit into the hollow end of a first shaft. The bushing is provided with a plurality of part-circular recesses on its inner surface. A spline adapter is slip-fit onto a second shaft. The spline adapter cooperates with the bushing, and has spline teeth extending from its outer surface which are substantially boat-shaped. The shape of the teeth allows for extra clearance at the ends of the coupling system, which is necessary to accommodate angular misalignment. The bushing is made of readily replaceable and relatively inexpensive plastic materials.

13 Claims, 6 Drawing Figures

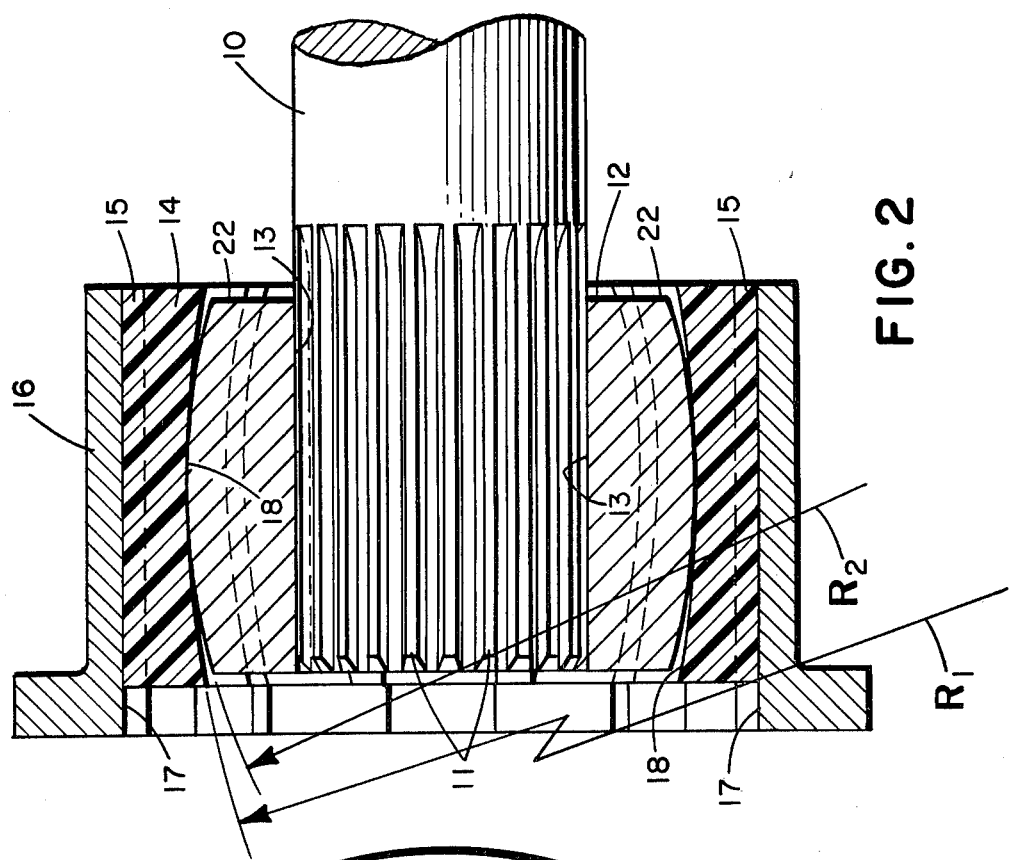
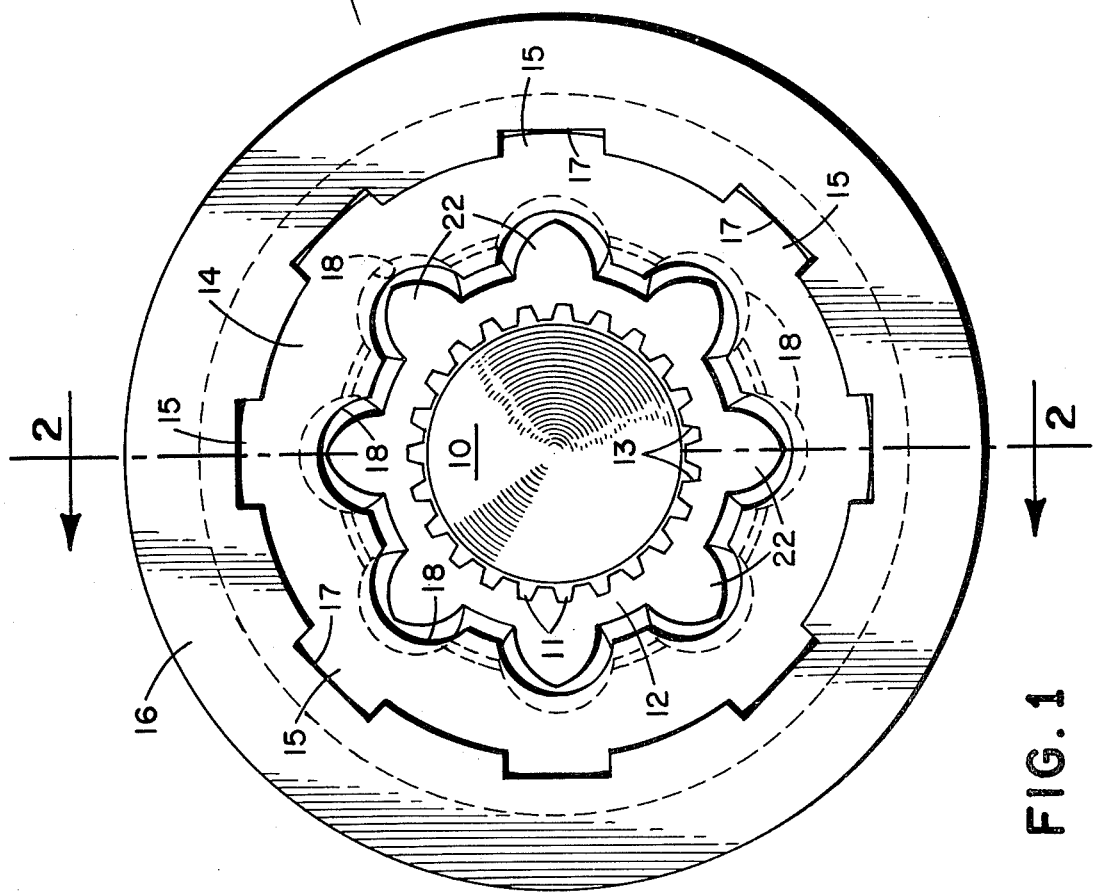

SHAFT COUPLING

CROSS REFERENCE TO RELATED APPLICATIONS

The subject of this application is an improvement over the shaft coupling disclosed in my co-pending application Ser. No. 179,006, filed Aug. 18, 1980, now U.S. Pat. No. 4,357,137.

BACKGROUND OF THE INVENTION

1. Field of the Invention

The present invention relates to a system for coupling drive and driven shafts. More particularly, it relates to a coupling system which is capable of accommodating angular misalignment and axial displacement. These coupling systems are often known as flexible couplings.

2. Description of the Prior Art

Flexible couplings are designed to allow the transmission of power between a drive shaft and a driven shaft, and usually include spline teeth which are in full contact along their flanks. These couplings permit axial displacement between the shafts and allow a limited amount of angular misalignment. The amount of misalignment depends upon the tooth shape and the amount of play between teeth and the drive and driven numbers. Metallic splines cannot accept relatively high amounts of misalignment, since the loss of contact area from misalignment results in high tooth stresses and fretting.

Non-metallic splines interpose a plastic bushing between mating teeth of the drive and driven shafts. This plastic bushing virtually eliminates the fretting problem described above with metallic splines. Only the expendable, inexpensive bushing is subject to wear. Attempts have been made to apply non-metallic spline couplings in situations where it is difficult to control the amount of angular misalignment. Such applications include aircraft and helicopter accessory drives, which are subject to changing angular misalignment, changing speeds and changing torques. As an example, in helicopter rotor drives, misalignments of as much as five degrees are encountered. Prior attempts to solve these problems have not satisfactorily provided increased clearance at the ends of the spline teeth for accommodating misalignment while simultaneously maintaining a relatively constant bearing surface area. Previous couplings have allowed only very minor amounts of misalignment.

SUMMARY OF THE INVENTION

It is an object of this invention to provide a shaft coupling capable of accepting relatively high amounts of angular misalignment, such as up to 10°, while maintaining a relatively constant bearing surface.

It is a further object of this invention to provide a shaft coupling capable of accommodating axial displacement simultaneously with angular misalignment.

It is a still further object of this invention to provide a shaft coupling which is inexpensive and easy to replace, and requires no lubrication or periodic maintenance.

The above objects and others are obtained by providing a spline coupling having a hollow bushing which cooperates with a first shaft and a spline adapter for a second shaft which cooperates with the bushing. The second shaft is axially movable within the spline adapter. The bushing is provided with a number of splines, formed by semicircular recesses in the inner surface of the bushing. The spline adapter is provided with a plurality of splines, having a boat-shaped configuration which permits greater clearances at the extreme ends of the splines. The sides of the spline adapter splines are arcuate, to provide the greatest bearing surface, and are cut to a substantially constant depth across their length to ensure constant bearing area under different amounts of misalignment.

BRIEF DESCRIPTION OF THE DRAWINGS

FIG. 1 is a front elevational view of the shaft coupling of the present invention;

FIG. 2 is a vertical axial sectional view taken along line 2—2 of FIG. 1;

DETAILED DESCRIPTION OF THE INVENTION

Figure 3:
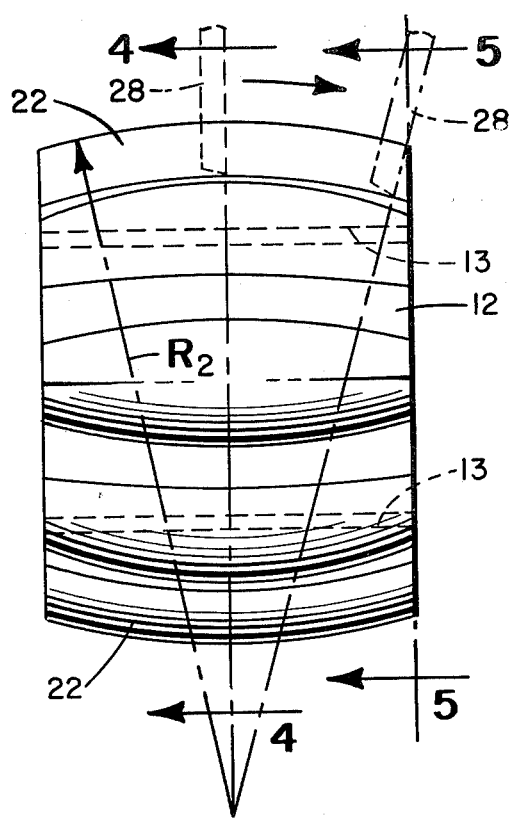
FIG. 3 is a side elevational view of a spline adapter, with milling cutter 28 shown in phantom lines.

The present shaft coupling system is made up of four main parts: a driven shaft 10, a spline adapter 12, bushing 14, and drive shaft 16. It should be noted that the designations as "drive shaft" and "driven shaft" are for convenience only, and that shaft 10 could be the drive shaft and shaft 16 could be driven shaft if so desired.

The bushing 14 is made of a high impact plastic. It can be compression or injection molded from high performance plastics such as polyamide and polyamide-imide resins. It is particularly advantageous if the resin is of the class which is self-lubricating. The driven shaft, spline adpater, and drive shaft are preferably made of steel. The use of different materials for the bushing and the adapter inhibits the tendency of the parts to mate together under load.

Teeth 11 of the driven shaft 10 mate with recesses 13 of the spline adapter 12 in a slip-fit relationship. This allows axial movement of the shaft 10 with respect to the spline adapter 12, and thus allows for axial displacement.

The bushing 14 is securely and substantially non-movably held within the drive shaft 16. This can be accomplished, for example, by providing teeth 15 on the bushing which form an interference fit with recesses 17 on the drive shaft. That is, the bushing is force-fit within the drive shaft. Of course, other methods of connecting the bushing to the drive shaft connecting the spline adapter to the driven shaft will be readily apparent to one ordinarily skilled in the art. There is a slip fit relation between adapter 12 and bushing 14.

Figure 4:
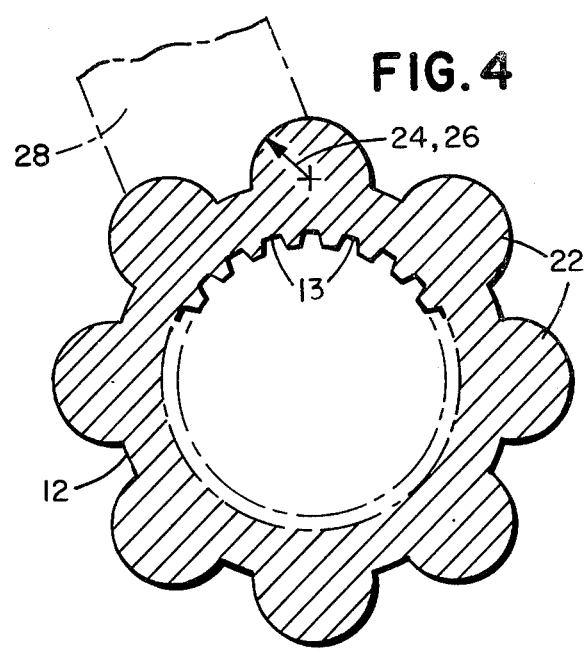
FIG. 4 is a transverse sectional view taken along line 4—4 of FIG. 3.
Figure 5:
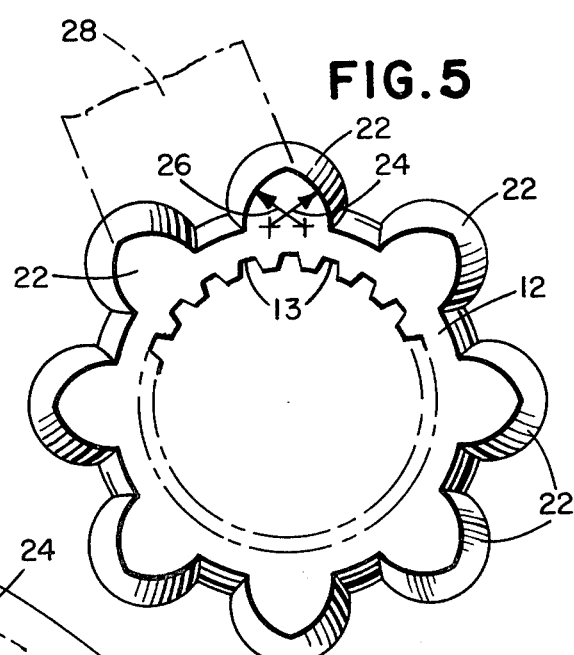
FIG. 5 is a front elevational view taken along line 5—5 of FIG. 3.
Figure 6:
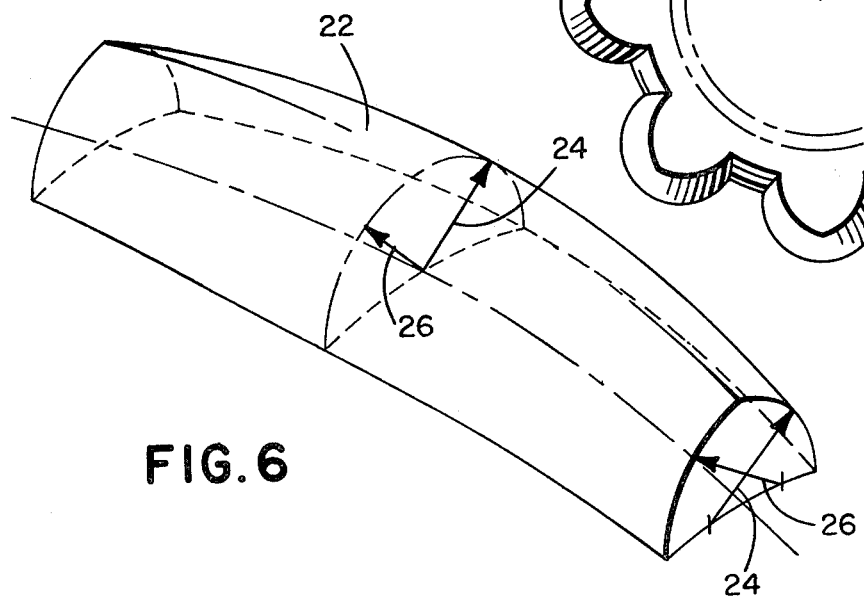
FIG. 6 is a perspective view of a single spline tooth of the spline adapter.

Referring now to FIGS. 2 through 6, the shape of the spline teeth of the spline adapter will now be described. As shown in FIG. 3, the surace of the spline adapter is formed to be arcuate in longitudinal axial cross section, having a radius of $R_2$. Referring to FIG. 6, the transverse cross section of a tooth 22 is formed by two arcs with substantially equal radii of curvature 24 and 26. These arcs form the sides of the tooth, and are substantially constant along the length of the tooth. The arcs terminate at a common point to form a radially outermost linear peak along the tooth. At the center of the tooth, where the diameter of the spline adapter is greatest, the centers of curvature of each arc coincide. That is, radius 24 and radius 26 each originate from the same point. At this point, of course, the cross section is part-circular. As the cross section is taken closer to the ends of the tooth, the centers of curvature migrate. Thus, as shown in FIG. 6, at the end of the tooth, the center of curvature for radius 24 has migrated towards the side which is the arc having radius 26, while the center of curvature for radius 26 has migrated towards the side which is the arc having radius 24. The tooth is preferably substantially symmetrical about the transverse line which includes the center of the tooth, but is not necessarily so. Moving from the point where the centers of curvature of radii 24 and 26 coincide toward the ends of the tooth, it is preferred that the distance between the centers of curvature increase. The shape can generally be considered as "boat-shaped".

The shape of the tooth may also be conceptualized by considering one method of forming the tooth, as shown in FIGS. 3 through 5. In these figures, a tooth 22 is formed by cutter 28. Cutter 28 may be conveniently thought of as cutting the space between the teeth. The diameter of the spline adapter 12 upon which the cutter works decreases as the cutter is moved away from the middle of the tooth. Thus, the same size gap is worked on a gradually decreasing diameter. As the cutter 28 approaches the ends of the teeth, it shaves off part of the tooth which was previously cut. This results in a slight decrease in the height of the tooth, which is not believed to significantly affect the performance of the shaft coupling. By giving each side of the teeth an arcuate (i.e. part-circular) configuration, an optimum and benign load bearing surface is provided. The "benign" surface allows for a friendly mating of the parts and reduces wear. Since the same cutter (or cutters of the same size) is used for each tooth, the radius of curvature is the same for all the arcs which form the flanks of the teeth. The amount of arc which the cutter transverses determines radius $R_2$, and thus the amount of misalignment which can be tolerated. It is desirable that a misalignment of up to 10° be accepted by the coupling.

The inner surface of the bushing 14 is provided with a plurality of arcuately formed part-circular recesses 18. As can be seen in FIG. 2, the bushing is formed so that, in its inner surface, a longitudinal arcuate groove is formed having radius $R_1$. The provision of this longitudinally curved surface permits the bushing 14 to hold the spline adapter 12 securely so that the spline adapter will not axially slide out of the bushing 14. Of course, if no axial displacement is contemplated, the bushing could be formed so as to be substantially cylindrical and the shaft 10 and spline adapter 12 could be of unitary construction. The portion 16 could be directly machined on a drive shaft, or, as is well known in the art, the coupling could be executed by bolting a separate part 16 onto a shaft via bolt holes, which could be provided in the outwardly extending flange.

Unlike the spline teeth 22 of the spline adapter, the recesses 18 of the bushing have a constant size and shape along the length of the bushing. It is important that the ridges between the recesses of the bushing do not extend further towards the interior of the bushing than the form diameter of the bushing. The form diameter is an imaginary circle defined by the centers of curvature of each recess. The greatest form diameter of the bushing is substantially equal to the greatest form diameter of the spline adapter, which is described by the imaginary circle defined by the centers of curvature of the spline teeth 22 at the point of coincidence for the centers of curvature of radii 24 and 26. The recesses between each spline tooth 22 do not extend further inwardly than the form diameter of the spline adapter. Of course, the radius of the bushing recesses cannot be less than either of the radii 24 and 26. Otherwise, the spline teeth could not engage the bushing. The number of teeth may be varied, but enough must be provided so that the load is safely carried.

It can thus be seen that the present shaft coupling accommodates axial displacement through slip-fit engagement of shaft 10 and adopter 12, and simultaneous angular misalignment between shafts 10 and 16 is accommodated through the difference between $R_1$ and $R_2$. A small difference between $R_1$ and $R_2$ can provide accommodation of a relatively large misalignment. The ratio of $R_1$ to $R_2$ will depend on the actual size of the coupling, the number of teeth, and amount of misalignment to be accommodated. Clearance at the ends of the coupling necessary to accommodate the angular misalignment is provided by the special spline tooth shape described above. The arcuate sides and substantially constant height of these teeth provide that an optimum and benign bearing surface will be provided, despite any angular misalignment.

What is claimed is:

1. A shaft coupling system comprising:
a first shaft having a hollow end;
a hollow bushing secured within the hollow end of said first shaft;
a second shaft having means for cooperating with said hollow bushing on the end of said second shaft, said means for cooperating having a surface arcuate in longitudinal cross section and having spline teeth extending from the surface, each of said spline teeth having an outer surface part-circular in longitudinal cross section, defined by a radius substantially greater than the distance between an axis of said second shaft and the outer surface of said teeth, and having a transverse cross section defined by substantially identical first and second part-circular arcs meeting at a single common point, said first and second arcs defining first and second sides respectively of the tooth, the radius centers of said first and second arcs coinciding at the point where the surface of said means for cooperating is the greatest radial distance from the center of said second shaft and from said point of coincidence to each end of said spline teeth, the radius center radius of said first arc is closer to said second side than to said first side, and the radius center of said second arc is closer to said first side than said second side, such that said teeth are tapered from said point to each end and the radial height of the teeth is greatest at the point of coincidence and decreases progressively from that point to each end.

2. A shaft coupling system comprising:
a first shaft having a hollow end;
a hollow bushing secured within the hollow end of said first shaft, the inner surface of said hollow bushing being provided with a plurality of part-circular recesses and corresponding areas between adjacent recesses, said areas extending no further towards the center of said bushing than the circle formed by the radius centers of said recesses;
a second shaft;
a spline adapter slip-fit onto said second shaft for cooperating with said bushing, having a surface formed so as to be arcuate in longitudinal cross section, having spline teeth extending from the surface of said spline adapter, said spline teeth having an outer surface part-circular in longitudinal cross section, defined by a radius substantially greater than the distance between an axis of said second shaft and the outer surface of said teeth, each of said teeth having a transverse cross section defined by substantially identical first and second part-circular arcs meeting at a single common point, said first and second arcs defining first and second sides respectively of the tooth, the radius centers of said first and second arcs coinciding at the point where the surface of said spline adapter is the greatest radial distance from the center line of said second shaft and from said point of coincidence to each end of each tooth, the radius center of said first arc is closer to said second side than to said first side, and the radius center of said second arc is closer to said first side than to said second side, such that said tooth is tapered from said point to each end and the radial height of the teeth is greatest at the point of coincidence and decreases progressively from that point to each end.

3. A shaft coupling system as claimed in claim 1 or claim 2, wherein each of said spline teeth is of substantially uniform height for the length of the spline tooth.

4. A shaft coupling system as claimed in claim 2, wherein said bushing is formed so as to have an inner surface which is arcuate in longitudinal cross section, the arcuate cross section of said bushing having a radius greater than that of the arcuate longitudinal cross section of said spline adapter surface and that of the arcuate longitudinal cross section of said teeth.

5. A shaft coupling system as claimed in claim 1 or claim 2, wherein said bushing is force fit into the hollow end of said first shaft.

6. A hollow spline adapter for use in a shaft coupling system, comprising:
an inner surface having means for cooperating with a shaft;
an outer surface having an arcuate longitudinal cross section;
spline teeth extending from the outer surface, each of said teeth having an outer surface part-circular in longitudinal cross section, defined by a radius substantially greater than the distance between an axis of said shaft and the outer surface of said teeth, and having a transverse cross section defined by substantially identical first and second part-circular arcs meeting at a single common point, said first and second arcs defining first and second sides respectively of the tooth, the radius centers of said first and second arcs coinciding at the point where the surface of said spline adapters is the greatest radial distance from the center line of said spline adapter, from said point of coincidence to each end of said teeth, the radius center of said first arc is closer to said second side then to said first side, and the radius center of said second arc is closer to said first side than to said second side, such that said teeth are tapered from said point to each end, and the radial height of the teeth is greatest at the point of coincidence and decreases progressively from that point to each end.

7. A spline adapter as claimed in claim 6, wherein the height of each of said teeth is substantially uniform along the length of the teeth.

8. A shaft coupling system as claimed in claim 2, wherein the point of coincidence for the centers of curvature of said first and second arcs is located at the middle of the length of the spline adapter.

9. A shaft coupling system as claimed in claim 8, wherein each tooth of the spline adapter is longitudinally symmetrical about the middle of the length of each tooth.

10. A spline adapter as claimed in claim 7, wherein the point of coincidence for the centers of curvature of said first and second arcs is located at the middle of the length of the spline adapter.

11. A spline adapter as claimed in claim 10, wherein each tooth of the spline adapter is longitudinally symmetrical about the middle of the length of each tooth.

12. A shaft coupling system as claimed in claim 2, wherein said second shaft is slidable axially relative to and within said adapter, whereby the axial displacement of said shaft in said coupling system is permitted.

13. A shaft coupling system as claimed in claim 6, wherein a second shaft is slidable axially relative to and within said adapter, whereby the axial displacement of said shaft in said coupling system is permitted.

* * * * *